United States Patent

[11] 3,562,442

[72] Inventor Charles B. Pear, Jr.
Centerport, N.Y.
[21] Appl. No. 775,228
[22] Filed Oct. 4, 1968
[45] Patented Feb. 9, 1971
[73] Assignee Potter Instrument Company, Inc.
Plainview, N.Y.
a corporation of New York

[54] MULTI-TRACK MAGNETIC RECORDING HEADS AND METHOD OF CONSTRUCTION THEREFOR
4 Claims, 6 Drawing Figs.

[52] U.S. Cl. .......... 179/100.2, 29/603, 340/174.1
[51] Int. Cl. .......... G11b 5/28, G11b 5/42
[50] Field of Search .......... 179/100.2C; 340/174.1F; 346/74MC; 29/603

[56] References Cited
UNITED STATES PATENTS

| | | | |
|---|---|---|---|
| 3,353,261 | 11/1967 | Bradford | 179/100.2 |
| 3,145,452 | 8/1964 | Camras | 179/100.2 |
| 2,800,534 | 7/1957 | Bradford | 179/100.2 |

FOREIGN PATENTS

| | | | |
|---|---|---|---|
| 776,348 | 6/1957 | Great Britain | 346/74 |

*Primary Examiner*—J. Russell Goudeau
*Attorney*—Laurence J. Marhoefer

ABSTRACT: The specification and drawings disclose a multiple track magnetic head in which long-wearing pole tip pieces are formed from a single block of material by first cutting slots in the block, next inserting isolators in the slots, then coating the isolators with a wear-resistant material, and then grinding away the lower surface of the block to form discrete pieces.

PATENTED FEB 9 1971 3,562,442

INVENTOR
CHARLES B. PEAR, JR.
BY
ATTORNEY

MULTI-TRACK MAGNETIC RECORDING HEADS AND METHOD OF CONSTRUCTION THEREFOR

BACKGROUND OF THE INVENTION

This invention relates to a multiple track magnetic head for magnetic tape transports and other similar applications in which the head contacts the recording medium and, more particularly, to a multiple track head with a long-wearing surface and to an improved method of manufacturing such a head.

As will be appreciated by those skilled in the art, in a magnetic tape transport the tape continuously contacts the head while recording or reading information on the tape. At the high tape speeds presently used on certain commercially available transports the head wears rapidly, resulting in an undesirably short operational life.

Prior art attempts to produce a wear-resistant multiple track magnetic head chiefly have centered around choosing materials that have both good magnetic properties (e.g. high permeability) and good mechanical properties (e.g. wear-resistant). In addition, proposals have been made in the prior art for coating the surface of the head with various wear-resistant materials. None of the prior art proposals, however, have been successful in producing a multiple channel magnetic head that is both practical to manufacture and long-wearing at high tape speeds.

One object of this invention is to provide a multiple channel magnetic head in which the transducer pole pieces in the region of the gap are made of a wear-resistant material that has good magnetic properties.

Another object of this invention is the provision of a head that has a wear-resistant coating over the spacers and magnetic shields which separate and magnetically isolate the individual pole pieces.

SUMMARY OF THE INVENTION

Briefly, this invention contemplates the provision of a multiple channel magnetic head in which slots initially are cut into, but not completely through, two blocks of wear-resistant material which has good magnetic properties, such as blocks of single crystal ferrite material, for example. The blocks are joined together with a nonmagnetic gap between them. Magnetic shields and spacers are inserted in the slots which are deep enough that the upper surfaces of the shields and spacers are below the upper surface of ferrite block. Thereafter, the slotted surface of the block is coated with a hard, wear-resistant material such as tungsten carbide, for example. The unslotted portion of the bar is removed forming an assembly of discrete single crystal ferrite pole tips which is then bonded to an assembly of U-shaped pole pieces to complete the magnetic circuit. The coating covering the pole tips is then partially ground away, exposing the tips of the ferrite cores while leaving a wear-resistant coating covering the shields and spacers.

BRIEF DESCRIPTION OF THE DRAWINGS

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views, in which.

DESCRIPTION OF THE PREFERRED EMBODIMENTS

Figures 1, 2, 3, 4:
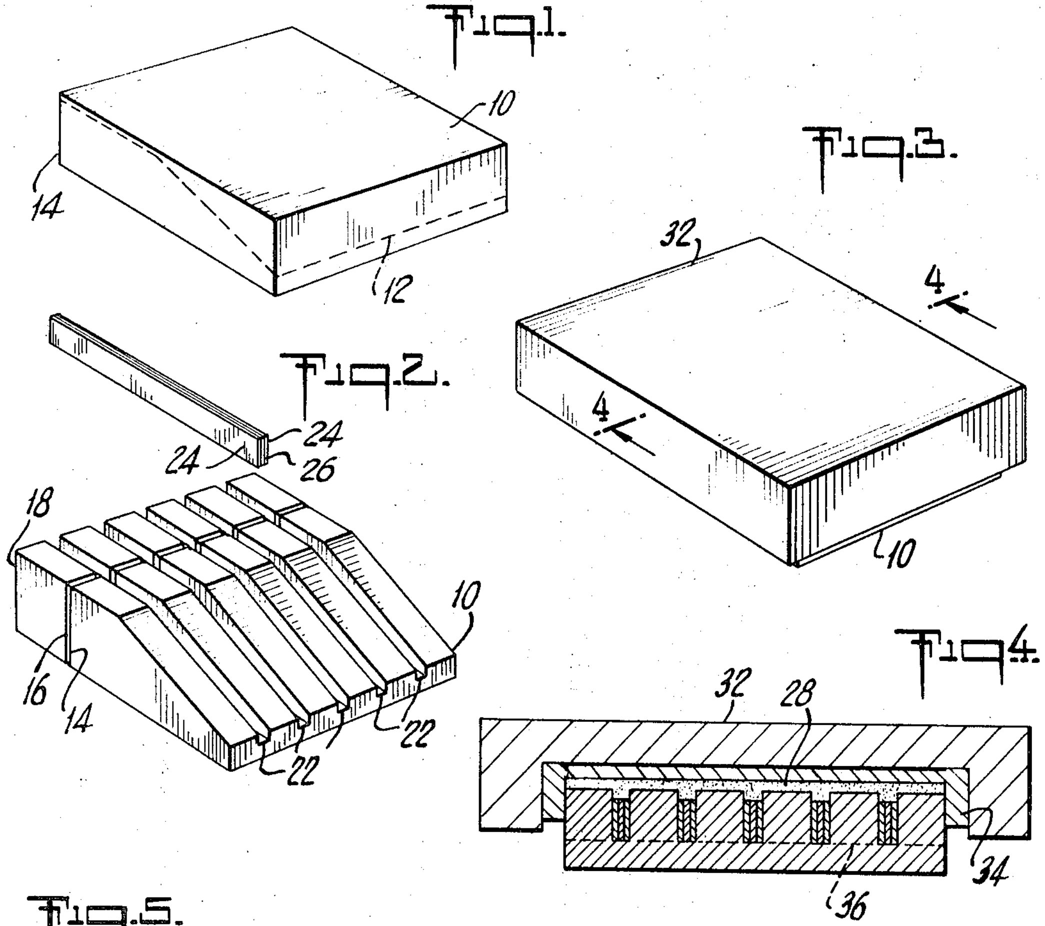
FIG. 1 is a perspective view of a block of wear-resistant material having advantageous magnetic properties.
FIG. 2 is a perspective view of two joined blocks, showing slots cut therein and the positioning of spacers and a magnetic shield in one of the slots.
FIG. 3 is a perspective view of a jig holding a partially assembled head.
FIG. 4 is a sectional view taken along the line 4—4 of FIG. 3.

Referring now to FIG. 1 of the drawings, as those skilled in the art understand, ferrite has advantageous magnetic properties that make it well suited for use as a pole piece for magnetic heads, and ferrite grown as a single crystal is hard and wear-resistant. However, small pieces of single crystal ferrite are brittle and difficult to handle. In these respects single crystal ferrite is similar to other materials which are suitable for the practice of this invention such as Duraperm, Alfenol and 5—6 percent Silicon Iron. Therefore, a relatively large block 10 cut from a single crystal ferrite is formed to a contour, such as that indicated by the dotted line 12 for example, which is suitable for the upper surface of a magnetic head. One surface 14 of the block 10 is lapped or otherwise suitably formed so that it is optically flat and may be joined with another similar single crystal ferrite block to form the transducing gap.

FIG. 2 shows the block 10 bonded to another single crystal ferrite block 18, forming a transducing gap 16. Glass-bonding techniques known in the art are suitable for bonding the blocks 10 and 18 together. A number of slots 22 are cut in the blocks 10 and 18 simultaneously, thereby assuring alignment of the respective slots in each block. Two nonmagnetic spacers 24 and a high permeability magnetic shield 26 for magnetically isolating the individual transducers that comprise the head are inserted into each of these slots 22 and are bonded in place by means of an epoxy, for example. With ferrite pole pieces, ceramic or Monel spacers are advantageous because their coefficient of temperature expansion is similar to that of ferrite. Brass and aluminum are also suitable spacer materials. The shield 26 may be a lamina of Hymu 80 sheets and sheets of a conducting material such as copper or silver. It should be noted that in the region of the gap 16 the upper surface of the spacers 24 and the shields 26 are sufficiently below the surface of the blocks 10 and 18 so that the tops of these spacers will still be slightly below the surface of the blocks after the blocks have been ground to their final shape.

Referring now to FIGS. 3 and 4, after spacers and magnetic shields have been bonded in each of the slots 22, a wear-resistant coating 28 is deposited over the slotted surface of the joined blocks 10 and 18. Advantageously, a tungsten carbide coating may be applied by a flame-spraying process commercially available from Union Carbide Corporation. Alternative coating materials such as ceramic materials and glass may also be employed, if desired. The entire coated assembly is placed in a suitable jig or holder 32 and removably bonded in place by means of a low melting point or easily soluble material 34 such as lead or wax. This jig holds and supports blocks 10 and 18 while the lower portions of these blocks are removed by grinding or any other suitable process known in the art for removing the block material and forming an optically flat surface. Enough material is removed so that the bottoms of spacers 24 and shields 26 are exposed and an optically flat surface is formed in a plane indicated by the dotted line 36 in FIG. 4.

Figure 5:
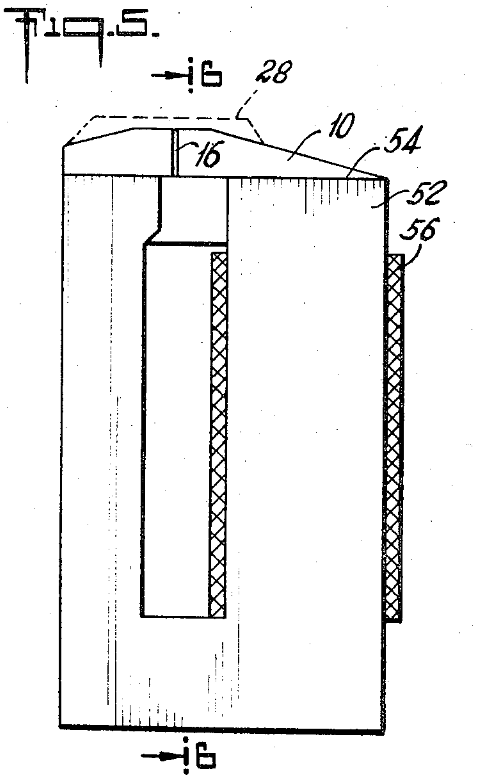
FIG. 5 is a side elevation of an assembled magnetic head constructed in accordance with the teaching of this invention.
Figure 6:
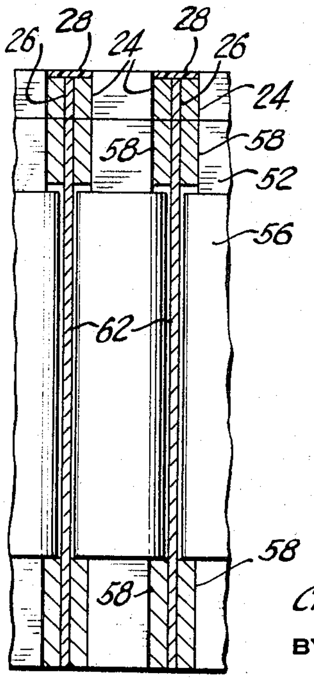
FIG. 6 is a partial sectional view taken along the lines 6—6 of FIG. 5.

Referring now to FIGS. 5 and 6, the assembly of FIG. 4 is bonded to an assembly of U-shaped pole pieces 52, nonmagnetic spacers 58 and magnetic shields 62. Advantageously, the U-shaped pole pieces are more narrow that the single crystal pole tips so that the alignment of the two assemblies is not critical. The U-shaped pole pieces may be formed conveniently of a sintered ferrite material, although metallic pole pieces would also be satisfactory. The spacers 58 and shields 62 may be of the same material as spacers 24 and shields 26. The assembly of pole pieces 52, spacers 58 and shields 62 is ground optically flat on its upper surface so that there is a low reluctance path between the pole tip assembly and the U-shaped pole pieces. Epoxy is a suitable bonding material. A magnetic winding 56 is disposed around one leg of each of the pole pieces 52. Conveniently, the coils 56 are wound separately and placed on the legs of the pole pieces before the gap assembly is positioned and for bonding.

After bonding the blocks 10 and 18 to the surface 54 of the U-shaped pole pieces 52, the jig 32 is removed and the wear-resistant coating material (indicated generally by the dotted line 56) is ground and then lapped until the pole tip material is just exposed at the gap 16. It should be noted that a thin layer of wear-resistant material 28 remains, coating the separators 24 and magnetic shield 26.

Thus, it will be appreciated that the objects of this invention have been accomplished. A multiple channel head constructed in accordance with the teachings of this invention has pole tips which can operate in contact with the magnetic tape. The spacers and magnetic shields are coated with a hard wear-resistant coating, and the entire multiple channel head is practical to manufacture.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

I claim:

1. A multiple track magnetic head comprising, in combination:

a plurality of pairs of discrete pole tip pieces, the pieces of each pair separated from one another by a low permeability transducing gap and each of said pieces made from a wear-resistant high permeability material, a plurality of pole pieces each of which is respectively joined to one of said pole tip pairs to form a low reluctance magnetic circuit between the discrete pieces of said pole tip pairs, a magnetic isolator disposed between adjacent ones of said pole tip pairs and recessed from the upper surface thereof, and a wear-resistant coating covering said isolators and forming a smooth continuous surface in the region of said transducing gap with said discrete pole tip pieces exposed in the region of said gap.

2. A multiple track magnetic head as in claim 1 wherein said discrete pole tip pieces are made of a single crystal ferrite.

3. A multiple track magnetic head as in claim 2 wherein said coating is tungsten carbide.

4. A method of manufacturing multiple track magnetic heads including the steps of:

shaping two pieces of wear-resistant high permeability material to respective desired contours which contours include at least one planar surface on each of said pieces, forming a transducing gap between said blocks by joining said blocks together along their planar surfaces, next forming a plurality of slots in the upper surface of said joined together blocks, next positioning a magnetic isolator in each of said slots so that the upper surface of said isolator is below the upper surface of said blocks in the region of said gap, next coating the upper surface of said isolator with a wear-resistant coating that forms a smooth surface in the region of said gaps with the exposed upper surface of said blocks, and forming discrete pole tip pairs by removing material from the lower surface of said block to the bottom of said slots.